United States Patent
Poh et al.

(10) Patent No.: US 7,674,030 B2
(45) Date of Patent: Mar. 9, 2010

(54) LIGHT SOURCE FOR EVEN ILLUMINATION OF A LIGHT GUIDE

(75) Inventors: Ju Chin Poh, Penang (MY); Thye Linn Mok, Penang (MY); Sundar Natarajan Yogan, Penang (MY); Tong Fatt Chew, Penang (MY); Fook Chuin Ng, Penang (MY); Siew It Pang, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 335 days.

(21) Appl. No.: 11/438,853

(22) Filed: May 23, 2006

(65) Prior Publication Data

US 2007/0274079 A1 Nov. 29, 2007

(51) Int. Cl.
*F21V 7/04* (2006.01)

(52) U.S. Cl. ........................ 362/613; 362/330; 362/249; 362/800; 362/628; 362/341

(58) Field of Classification Search .................. 362/613, 362/249, 800, 628, 330, 335, 600–634, 612, 362/631, 97.3, 219, 249.01, 249.02
See application file for complete search history.

(56) References Cited

U.S. PATENT DOCUMENTS

| | | | | |
|---|---|---|---|---|
| 6,323,832 B1 * | 11/2001 | Nishizawa et al. | ............ | 345/83 |
| 6,647,199 B1 * | 11/2003 | Pelka et al. | .................. | 385/146 |
| 7,042,546 B2 * | 5/2006 | Tamashiro et al. | .......... | 349/190 |
| 2002/0114155 A1 * | 8/2002 | Katogi et al. | ............... | 362/219 |
| 2005/0002173 A1 * | 1/2005 | Chuang et al. | ................. | 362/31 |
| 2005/0052732 A1 | 3/2005 | Chen et al. | | |
| 2005/0264716 A1 * | 12/2005 | Kim et al. | ..................... | 349/61 |
| 2005/0270783 A1 | 12/2005 | Liu et al. | | |
| 2006/0092618 A1 * | 5/2006 | Tanaka et al. | .................. | 362/19 |

* cited by examiner

*Primary Examiner*—Sandra L. O'Shea
*Assistant Examiner*—Jessica L McMillan

(57) ABSTRACT

A lighting system is described. One embodiment of the lighting system includes a light guide, a first lighting device, and a second lighting device. The light guide receives light along a transmission interface. The first lighting device has a first plurality of lighting elements coupled to a first substrate between a first pair of reflector walls. The first substrate and the first pair of reflector walls define a first exposed side of the first lighting device. The second lighting device has a second plurality of lighting elements coupled to a second substrate between a second pair of reflector walls. The second substrate and the second pair of reflector walls define a second exposed side of the second lighting device configured to match the first exposed side of the first lighting device. Using lighting devices without sidewalls illuminates a diffusion panel so that there are no dark spots.

17 Claims, 9 Drawing Sheets

LIGHT SOURCE FOR EVEN ILLUMINATION OF A LIGHT GUIDE

BACKGROUND OF THE INVENTION

Most liquid crystal display (LCD) panels use backlighting to provide a bright image to the viewer. Backlighting is typically provided by diffusing white light from a fluorescent light source or several light emitting diode (LED) sources. To provide evenly distributed backlighting, LCD panels have a diffusion panel that receives the light along one edge of the panel and diffuses the light throughout the face of the diffusion panel. The white light may be directly generated by the fluorescent light source or the LEDs. However, colored LEDs emitting such colors as red, green, and blue (RGB) are also used in some applications. Where colored LEDs are used, the different colors are mixed to create the white light.

In applications that use LEDs, several LEDs typically are mounted on a single substrate. The LEDs and substrate are referred to as an LED device. Each LED device has reflector walls and sidewalls which surround the LEDs. Multiple LED devices are lined up along the edge of the diffusion panel. However, the sidewalls of the LED devices create a significant separation distance between the LEDs of adjacent LED devices. This separation due to the sidewalls creates dark spots on the diffusion panel where the light transmitted from the LEDs does not overlap. These dark spots are noticeable to a viewer because the diffusion panel does not provide evenly distributed backlighting. Although the LED devices may be moved farther away from the diffusion panel to allow the light to spread out more before transmitting into the diffusion panel, such increased distance would increase the cost of manufacturing and require larger package dimensions.

In view of this, what is needed is a light distribution solution to overcome the problems of dark spots on the diffusion panel.

SUMMARY OF THE INVENTION

A lighting system is described. One embodiment of the lighting system includes a light guide, a first lighting device, and a second lighting device. The light guide receives light along a transmission interface. The first lighting device has a first plurality of lighting elements coupled to a first substrate between a first pair of reflector walls. The first substrate and the first pair of reflector walls define a first exposed side of the first lighting device. The second lighting device has a second plurality of lighting elements coupled to a second substrate between a second pair of reflector walls. The second substrate and the second pair of reflector walls define a second exposed side of the second lighting device. The second exposed side of the second lighting device is configured to match the first exposed side of the first lighting device. By providing lighting devices without sidewalls, the lighting elements of adjacent lighting devices may be located close to one another so that there are no dark spots on the diffusion panel.

A lighting device is also described. One embodiment of the lighting device includes a substrate, a lighting element coupled to the substrate to emit light, a first reflector wall coupled substantially perpendicular to the substrate adjacent to the lighting element, and a second reflector wall coupled substantially perpendicular to the substrate adjacent to the lighting element. The second reflector wall is located opposite the first reflector wall so that the first and second reflector walls define an element channel in which the lighting element is coupled to the substrate. The first and second reflector walls further define a first channel opening between adjacent ends of the first and second reflector walls at a first end of the substrate.

A method for transmitting light into a light guide without dark spots is also described. One embodiment of the method includes providing a first lighting device having a first channel opening, providing a second lighting device having a second channel opening, and aligning the first channel opening of the first lighting device with the second channel opening of the second lighting device to transmit the light through substantially all of a transmission interface of the light guide. The first lighting device has a first lighting element and a first pair of reflective walls coupled to a first substrate. The first pair of reflective walls define the first channel opening. The second lighting device has a second lighting element and a second pair of reflective walls coupled to a second substrate. The second substrate and the second pair of reflective walls define the second channel opening.

Other aspects and advantages of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
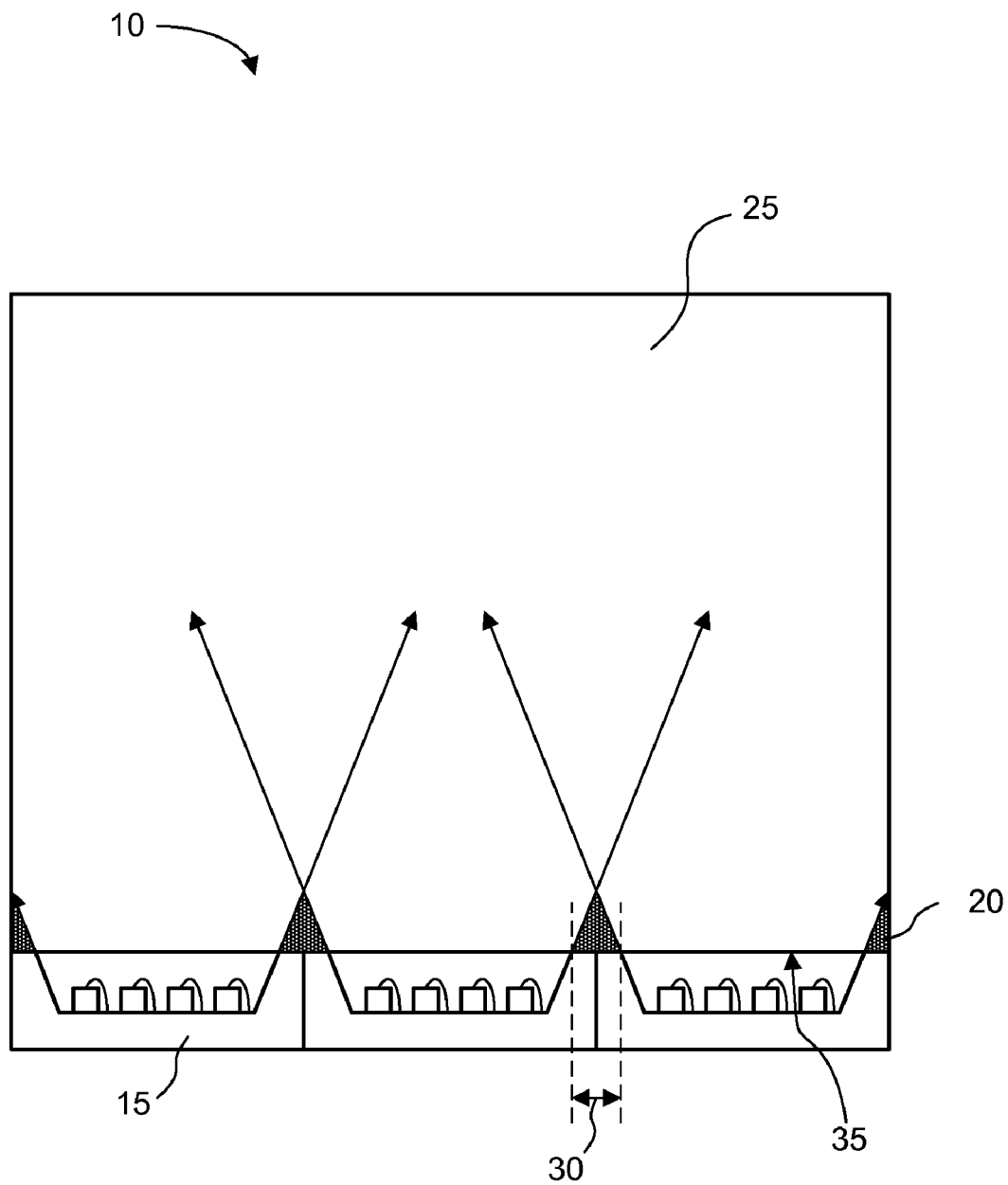
FIG. 1 depicts a conventional light system which uses LED devices having sidewalls resulting in dark spots on the light guide plate.

FIG. 1 depicts a conventional light system 10 which uses LED devices 15 having sidewalls resulting in dark spots 20 on the light guide plate 25. One example of a light guide plate 25 is a diffusion panel such as may be used in a liquid crystal display (LCD) panel. White or colored light from several light emitting diodes (LEDs) is transmitted into the light guide plate 25. The LEDs are mounted in a row on multiple LED devices 15. Conventional LED devices 15 are shown and described in more detail with reference to FIGS. 2 and 3.

The distance between adjacent LED devices 15 is referred to as pitch 30. The pitch 30 between the LED devices 15 at least partially determines the light pattern within the light guide plate 25. Where conventional LED devices 15 with sidewalls (i.e., the structural walls separating the LED dice, or chips, on adjacent LED devices 15) are used, the pitch 30 results in dark spots 20 on the light guide plate 25. For example, using conventional LED devices 15 with sidewalls results in dark spots 20 near the transmission interface 35 (i.e., edge) of a diffusion panel 25. Ideally, the diffusion panel 25 would evenly diffuse the light from the LEDs throughout the surface of the diffusion panel 25 to provide an even backlight for an LCD panel. However, the dark spots 20 resulting from the pitch 30 of the LED devices 15 may be visible to the user.

To reduce the appearance of dark spots 20 on the LCD panel, the LCD panel may be oversized so that the dark spots 30 are within a "black out" area not visible to the viewer. However, oversizing the LCD panel increases the cost and size of the LCD panel. Alternatively, the effective area of the LCD panel may be reduced, but reducing the effective area of the LCD panel would result in non-standard display ratios (i.e., display ratios other than 4:3, 16:9, etc.).

Figure 2:
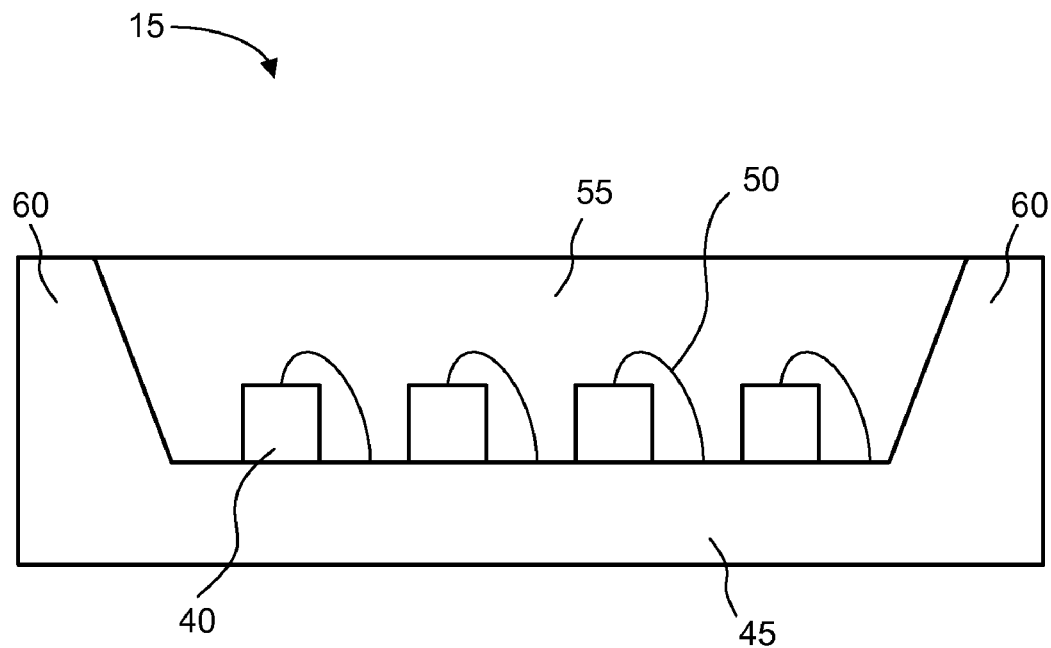
FIG. 2 depicts a lengthwise cross-section of a conventional LED device.

FIG. 2 depicts a lengthwise cross-section of a conventional LED device 15. The conventional LED device 15 includes several LEDs 40 (also referred to as LED chips or LED dice). The LEDs 40 are mounted on a substrate 45 such as a metal-coated plastic substrate. Bonding wires 50 are used to bond the LEDs 40 to the substrate 45. Reflector walls 55 and sidewalls 60 are also formed on or integrally with the substrate 45. The substrate 45, reflector walls 55, and sidewalls 60 form a dish-like cavity, and the LEDs 40 are mounted to the substrate 45 within the cavity. In this way, light from the LEDs 40 is emitted in a direction generally outward from the cavity. The reflector walls 55 may have a reflective surface so that light incident on the reflector walls 55 is reflected out of the cavity. Similarly, the sidewalls 60 may have reflective surfaces to reflect light out of the cavity.

Figure 3:
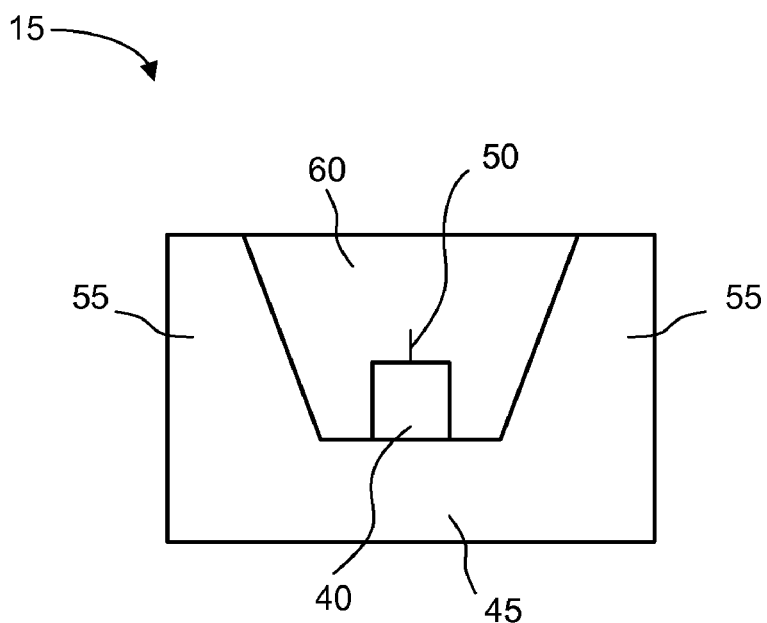
FIG. 3 depicts a side cross-section of a conventional LED device.

FIG. 3 depicts a side cross-section of a conventional LED device 15. The side cross-section of the conventional LED device 15 illustrates the LED 40, bonding wire 50, substrate 40, reflector walls 55, and sidewalls 60. The use of sidewalls 60 forces LEDs 40 from adjacent LED devices 15 to be separated by a significant distance, or pitch 30, approximately equal to the thickness of two sidewalls 60. This pitch 30 results in dark spots 20 on a light guide plate 25 when the LED devices 15 are lined up lengthwise (i.e., sidewall-to-sidewall) at the transmission interface 35 of the light guide plate 25. The dark spots 20 cause visible distortions on an LCD panel.

Figure 4:
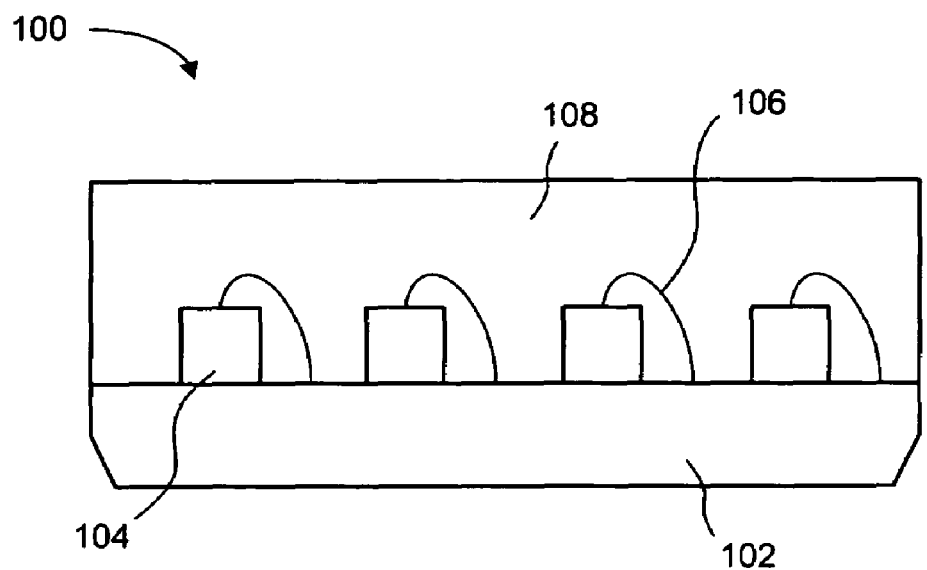
FIG. 4 depicts a lengthwise cross-section of an embodiment of a LED device without sidewalls.
Figure 5:
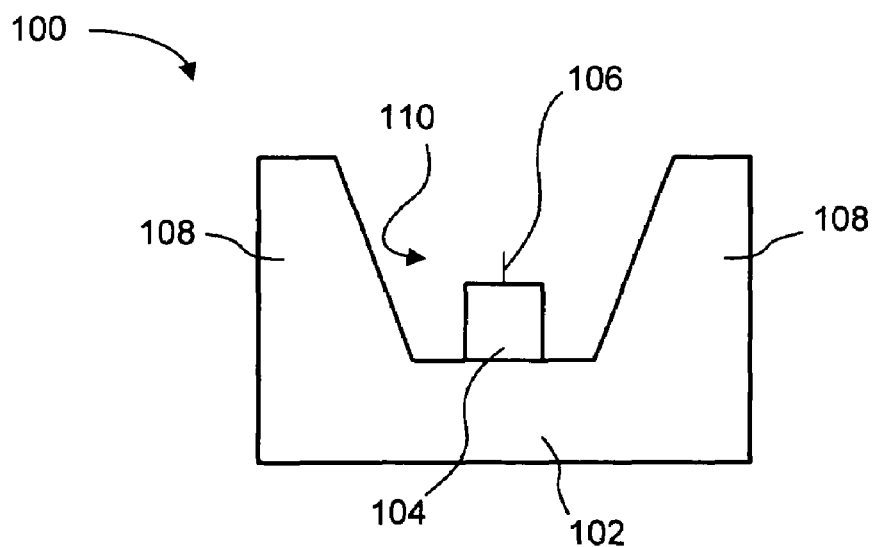
FIG. 5 depicts a side cross-section of the LED device of FIG. 4.

FIG. 4 depicts a lengthwise cross-section of an embodiment of a LED device 100 without sidewalls. FIG. 5 depicts a side cross-section of the LED device of FIG. 4. The LED device 100 includes a substrate 102 with multiple LEDs 104 mounted on the substrate 102. Bonding wires 106 are used to bond the LEDs 104 to the substrate 102. The LED device 100 also includes reflector walls 108 on opposite sides of the LEDs 104. In one embodiment, the reflector walls 108 extend the length of the substrate 102. Also, the reflector walls 108 may have a reflective coating such as a metal coating to facilitate reflections of light from the LEDs 104 into a light guide plate.

The LED device 100 differs in at least one aspect from the conventional LED device because the LED device 100 does not include sidewalls at the ends of the substrate 102. In one embodiment, the LED device 100 does not include any sidewalls, although other embodiments may include a sidewall at one end. As a result of excluding the sidewalls, the substrate 102 and reflector walls 108 do not form a dish-like cavity, but rather define a "U" shaped element channel with a channel opening 110 at one or both ends of the element channel. The LEDs 104 or other lighting elements are mounted on the substrate 102 within the element channel. The channel openings 110 are approximately where conventional sidewalls would be located.

Using embodiments of the LED device 100 with channel openings 110 rather than sidewalls may have advantages compared to conventional LED devices with sidewalls. For example, some embodiments of the LED device 100 may spread out the LEDs 104 on the substrate 102 so that they are more evenly distributed along the length of the substrate 102. In one embodiment, the distance from an end LED 104 (i.e., an LED 104 near a channel opening) to an end of the substrate 102 may be approximately the same as the distance between two adjacent LEDs 104 on the substrate 102. This distribution minimizes or eliminates the pitch between adjacent LED devices 100. In another example, the LED device 100 may accommodate more LEDs 104 on the substrate 102 because of the available surface area of the substrate 102 where conventional sidewalls otherwise might be located. Other embodiments may have additional or different advantages compared to conventional LED devices.

Figure 6:
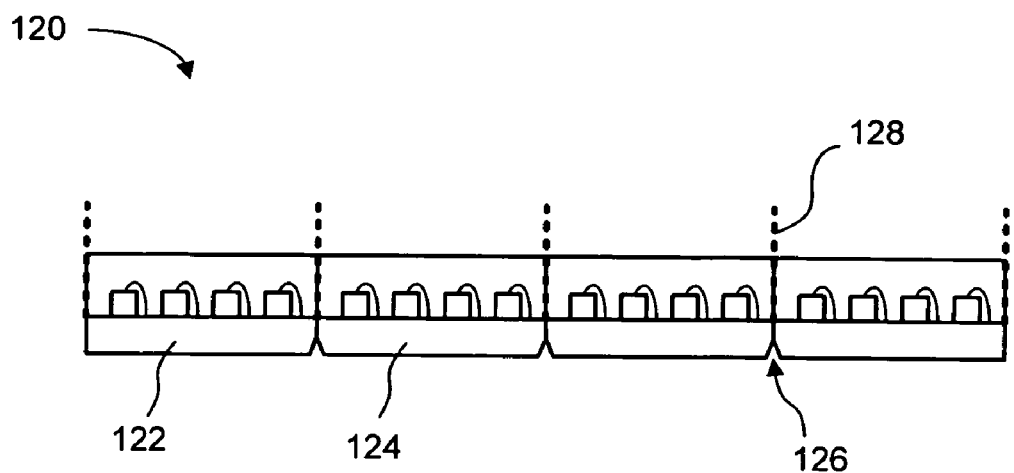
FIG. 6 depicts an embodiment of a segmented light strip having multiple LED devices.

FIG. 6 depicts an embodiment of a segmented light strip 120 having multiple LED devices 104. The multiple LED devices 104 may be mounted on a common substrate 102 as shown. For convenience, the LED devices 104 on either end of the segmented light strip 120 are designated as end LED devices 122. Similarly, the LED devices 104 between the end LED devices 122 are designated as middle LED devices 124. In one embodiment, the end LED devices 122 and middle LED devices 124 may be identical in structure, although other embodiments may have slight variations between the end LED devices 122 and middle LED devices 124. For example, the end LED devices 122 may be different from the middle LED devices 124 in order to facilitate manufacturing of the segmented light strip 120.

In one embodiment, the segmented light strip 120 includes a substrate 102 with notches 126 between adjacent LED devices 100. In fact, the notches 126 may delineate the LED devices 100 of the segmented light strip 120. Although the LED devices 100 of the segmented light strip 120 are shown having equal lengths and an equal number of LEDs 104 on each LED device 100, other embodiments may have other numbers of LED devices 100 with various lengths or different numbers of LEDs 104.

In another embodiment, the segmented light strip 120 also includes separation plates 128 between adjacent LED devices 100. Additionally, the segmented light strip 120 may include separation plates 128 at one or both ends of the segmented light strip 120. The separation plates 128 may be metal, plastic, or another material. In one embodiment, the separation plates 128 facilitate separation of adjacent LED devices 100 within the segmented light strip 120. In another embodiment, the separation plates 128 may facilitate encapsulating the LEDs 104 within an encapsulant between the reflector walls 108. The separation plates 128 may be fixed within the segmented light strip 120 or may be removeable from the segmented light strip 120.

Figure 7:
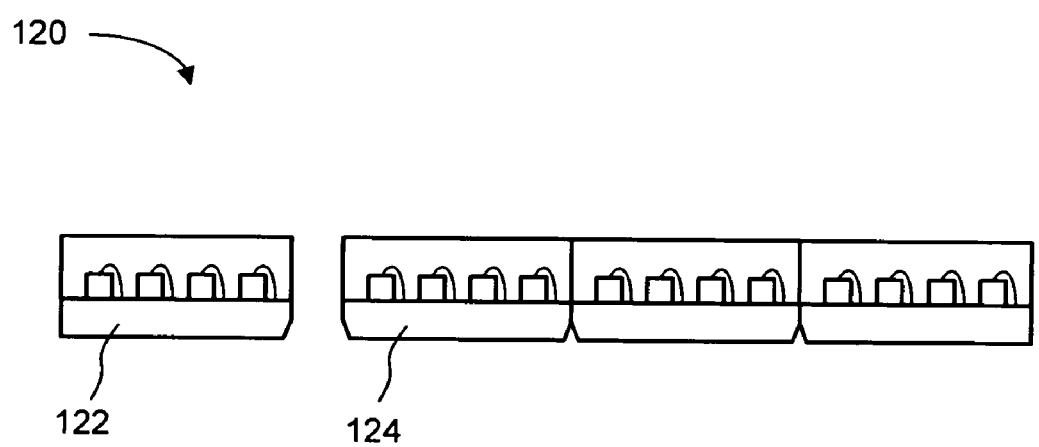
FIG. 7 depicts one embodiment of the segmented light strip of FIG. 6 having one of the LED devices separated from the remaining LED devices.

FIG. 7 depicts one embodiment of the segmented light strip 120 of FIG. 6 having one of the LED devices 100 separated from the remaining LED devices 100. In particular, an end LED device 122 is separated from the adjacent middle LED device 124. To facilitate the separation of the end LED device 122, the separation plate 128 between the end LED device 122 and the adjacent middle LED device 124 may be removed. Additionally, the substrate 102 may be broken, sawed, cut, or otherwise severed at the notch 126 between the end LED device 122 and the adjacent middle LED device 124. Separating LED devices 100 within the segmented light strip 120 may allow a portion of the segmented light strip 120 to be matched in length to a particular light guide plate.

Figure 8:
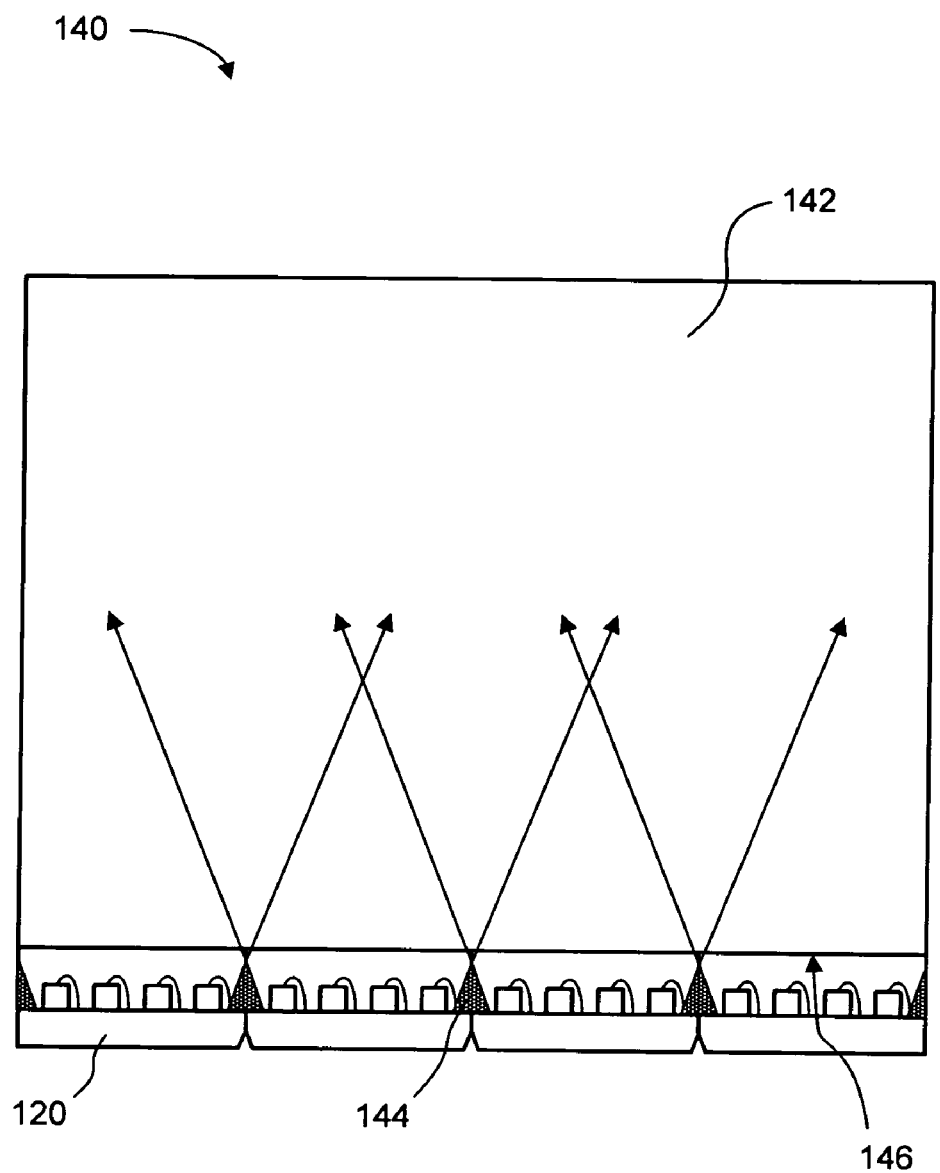
FIG. 8 depicts one embodiment of a light system which uses a segmented light strip to illuminate a light guide plate without dark spots on the light guide plate.

FIG. 8 depicts one embodiment of a light system 140 which uses a segmented light strip 120 to illuminate a light guide plate 142 without dark spots 144 on the light guide plate 142. The segmented light strip 120 is located and oriented to propagate light into the light guide plate 142 through a transmission interface 146 of the light guide plate 142. In the illustrated embodiment, there are no dark spots 144 within the light guide plate 142. Although there may be some dark spots 144 outside of the light guide plate 144 between adjacent LED devices 100, other embodiments of the segmented light strip 120 may minimize or eliminate such dark spots 144. For example, the occurrence of dark spots 144 may be affected by the distance between the LEDs 104 of adjacent LED devices 100. In one embodiment, the distance between LEDs 104 of adjacent LED devices 100 may be approximately the same as the distance between adjacent LEDs 104 on a single LED device 100. For example, the distance between an LED 104 and the adjacent edge (or notch 126) of the corresponding LED device 100 may be about one-half of the distance between adjacent LEDs 104 on a single LED device 100. In this way, the total distance between adjacent LEDs 104 on adjacent LED devices 100 may be about the same as the distance between adjacent LEDs 104 on the same LED device 100.

In one embodiment, the segmented light strip 120 has a continuous, common substrate 102 that is notched to allow individual LED devices 100 to be separated from the other LED devices 100. In an alternative embodiment, the segmented light strip 120 may include several individual LED devices 100, each having an individual substrate 120. In other words, individual LED devices 100 may be arranged to form a segmented light strip 120 within the light system 140.

Figure 9:
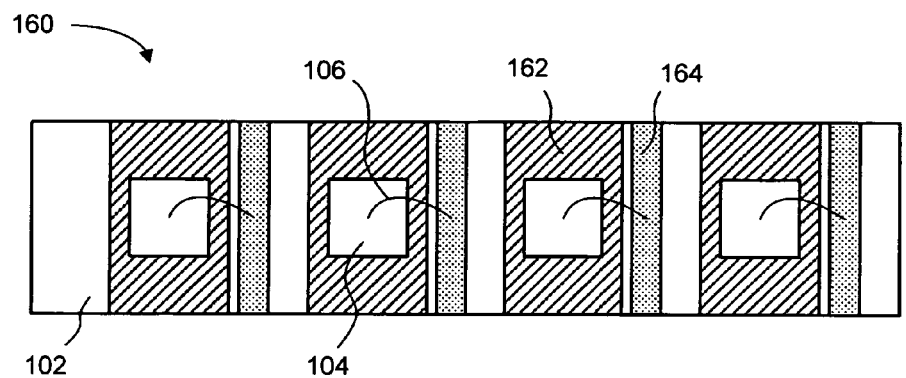
FIG. 9 depicts a top view of one embodiment of a LED device.

FIG. 9 depicts a top view 160 of one embodiment of a LED device 100. In particular, the top view 160 illustrates the substrate 102 and LEDs 104 between the reflective walls 108 (although the reflective walls 108 are not shown). In one embodiment, the substrate 102 is a metal-coated plastic substrate. The substrate 102 may have multiple metal coatings which may be used to bond different electrical connections. The metal coatings may be gold (Au), silver (Ag), or another type of metal bonding material. Alternatively, the substrate 102 may use a non-metallic bonding material. In one embodiment, the substrate 102 includes several mounting plates 162 and several corresponding bonding plates 164. In one embodiment, the LEDs 104 are mounted to the mounting plates 162, and the bonding wires 106 are bonded to the bonding plates 164.

Figure 10:
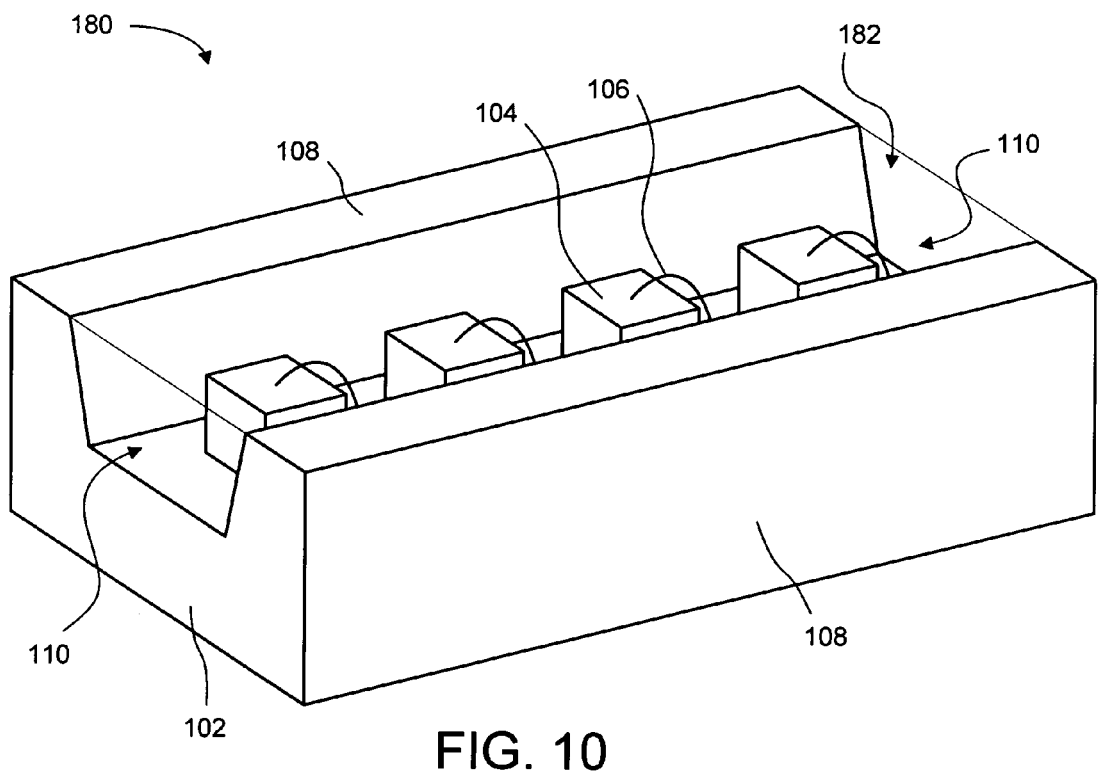
FIG. 10 depicts a perspective view of one embodiment of a LED device without sidewalls.

FIG. 10 depicts a perspective view 180 of one embodiment of a LED device 100 without sidewalls. The perspective view 180 illustrates multiple LEDs 104 mounted on and bonded to a substrate 102. Reflector walls 108 extend along the length of the substrate 102 on either side of the substrate 102 to form an element channel in which the LEDs 104 are mounted. The element channel has channel openings 110 at both ends where the element channel is exposed because there are no sidewalls at the ends of the substrate 102. The perspective view 180 also illustrates an encapsulant 182 which may be used to protect the LEDs 104 and bonding wires 106. In one embodiment, the encapsulant 182 may be silicone or another type of translucent encapsulant which allows the light from the LEDs 104 to propagate into the light guide plate 142.

Figure 11:
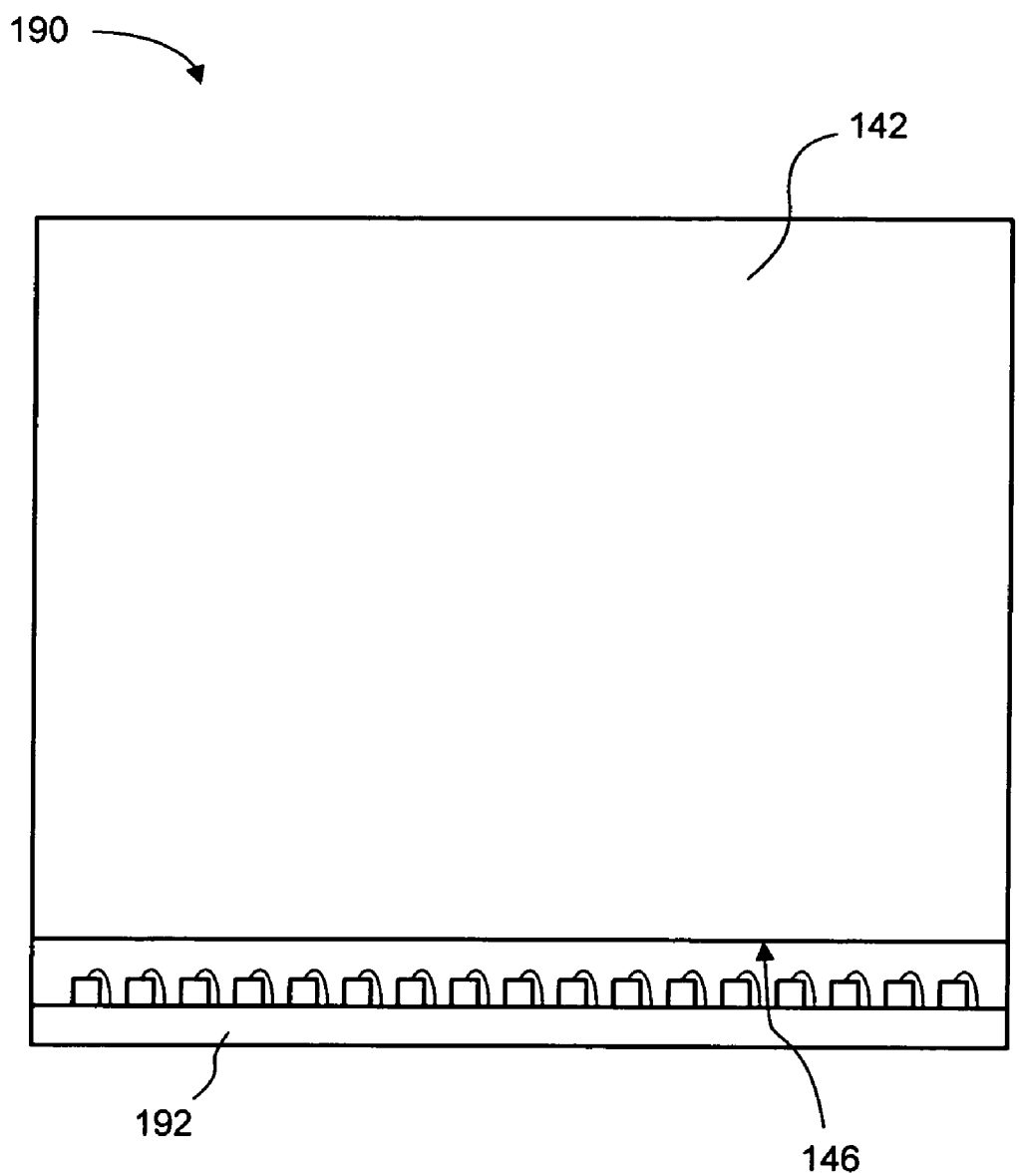
FIG. 11 depicts one embodiment of a light system which uses a strip light source.

FIG. 11 depicts one embodiment of a light system 190 which uses a strip light source 192. The light system 190 is similar to the light system 140 of FIG. 8, except the light system 190 uses a strip light source 192 that is not segmented. The strip light source 192 is located and oriented to propagate light through the transmission interface 146 into the light guide plate 142. By using a strip light source 192 which is approximately the same length as the transmission interface 146 of the light guide plate 142, the light guide plate 142 may diffuse the light without visible dark spots.

Figure 12:
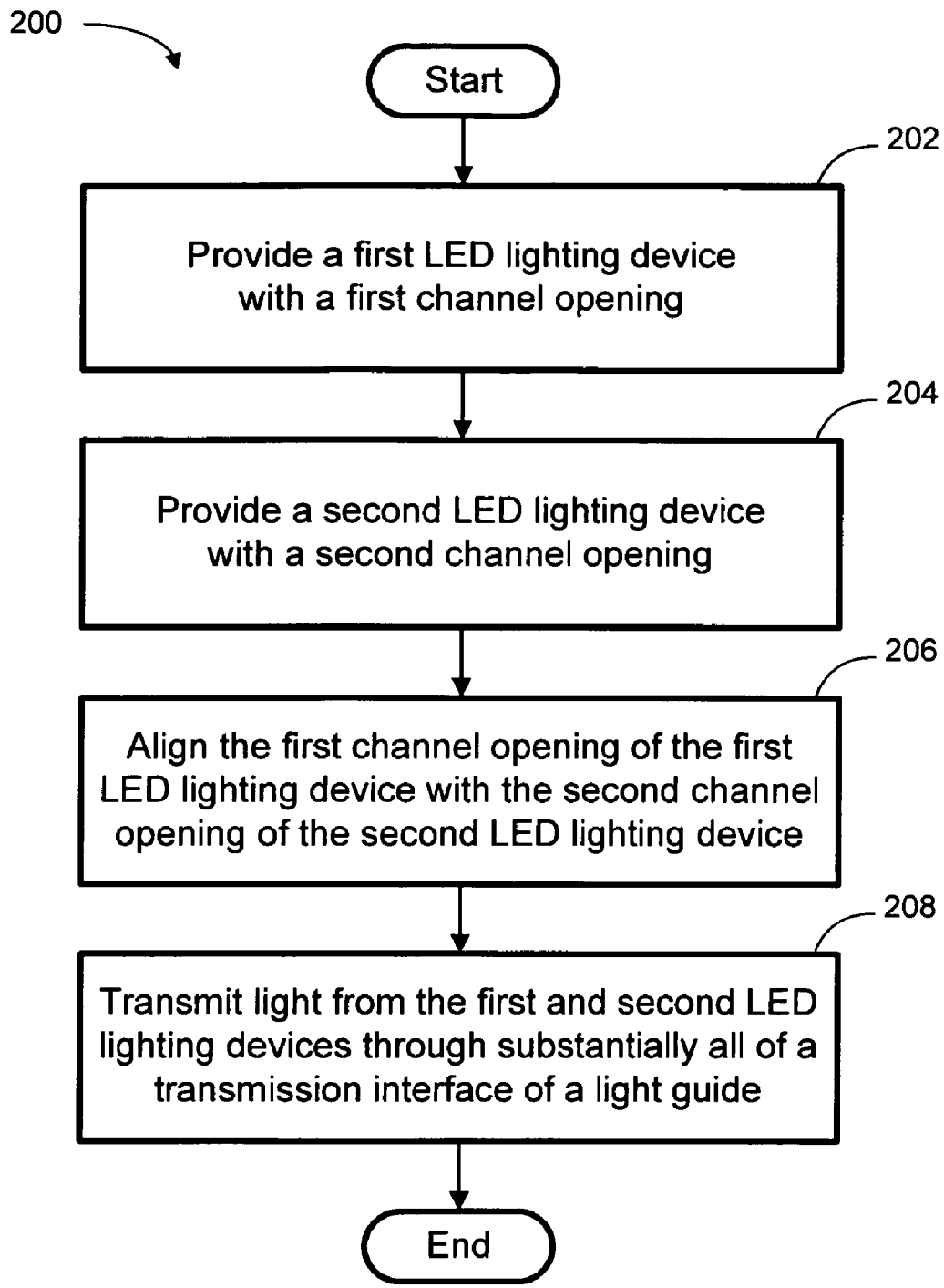
FIG. 12 is a process flow diagram of a light method which may be used in conjunction with the light system.

FIG. 12 is a process flow diagram of a light method 200 which may be used in conjunction with the light system 140. At block 202, a first LED lighting device 100 is provided. The first LED lighting device 100 has a first channel opening 110 at one end of the corresponding substrate 102. At block 204, a second LED lighting device 100 is provided. The second LED lighting device 100 has a second channel opening 110 at one end of the corresponding substrate 102. In one embodiment, the first and second LED devices 100 may be on a single, common substrate 102. Alternatively, the first and second LED devices 100 may have separate substrates 102. At block 206, the first channel opening 110 of the first LED device 100 is aligned with the second channel opening 110 of the second LED device 100. Aligning the first and second channel openings 110 may occur at the fabrication stage where the first and second LED devices 100 are fabricated in a single segmented light strip 120 with a common substrate 102. Alternatively, the first and second channel openings 110 may be aligned at an assembly stage when the LCD panel is assembled. At block 208, the LEDs 104 transmit light from the first and second LED lighting devices 100 into the light guide plate 142. The light is transmitted through substantially all of the transmission interface 146 of the light guide plate 142. In this manner, there are no dark spots in the light guide plate 142 because light is transmitted through substantially all of the transmission interface 146. In contrast, if light were not transmitted through some areas of the transmission interface 146, for example where light from adjacent LED devices 100 does not overlap, then dark spots 144 may appear at the locations where light is not propagated through the transmission interface 146.

Figure 13:
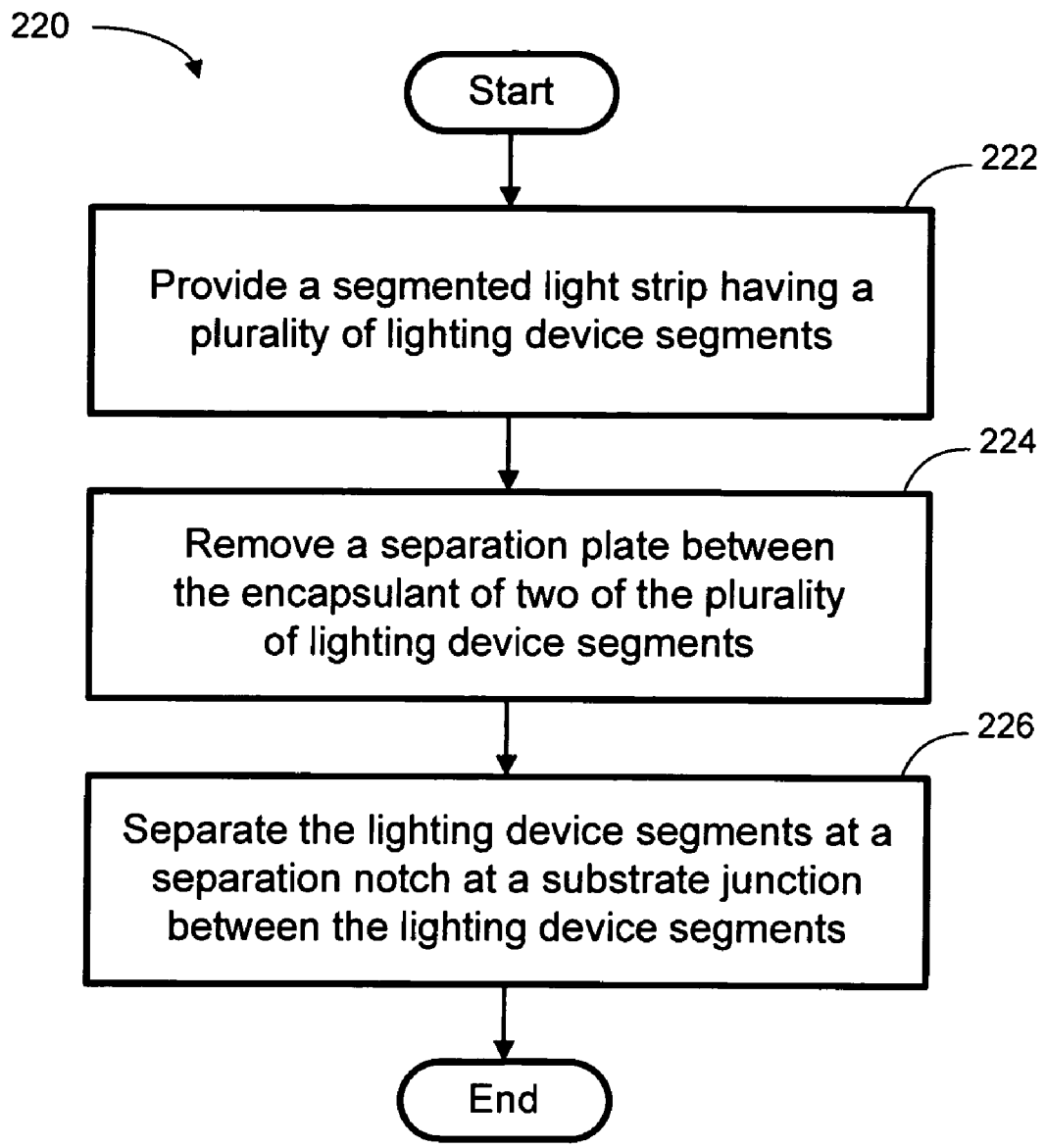
FIG. 13 is a process flow diagram of a segmentation method which may be used in conjunction with a segmented light strip.

FIG. 13 is a process flow diagram of a segmentation method 220 which may be used in conjunction with a segmented light strip 140. In particular, the segmentation method 220 applies to a segmented light strip 140 having a common substrate 102 for multiple LED devices 100. At block 222, a segmented light strip 120 is provided. The segmented light strip 120 includes a plurality of lighting device segments such as the LED devices 100. At block 224, a separator plate 128 is removed from between the encapsulant 182 of two of the lighting device segments. At block 226, the lighting device segments are separated at a separation notch 126 in the substrate at a junction between the two lighting device segments. One example of a separated LED device 100 is shown and described in more detail with reference to FIG. 7.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A lighting system comprising:
   a light guide to receive light along a transmission interface;
   a first lighting device having a first plurality of lighting elements coupled to a first substrate between a first pair of reflector walls, wherein the first substrate and the first pair of reflector walls define a first exposed side of the first lighting device;
   a second lighting device having a second plurality of lighting elements coupled to a second substrate between a second pair of reflector walls, wherein the second substrate and the second pair of reflector walls define a second exposed side of the second lighting device configured to match the first exposed side of the first lighting device; and
   a notch at a junction of the first and second substrates, wherein the notch is on the bottom of the first and second substrates, and wherein the first and second substrates are coupled together at the notch aligned with a separator plate to facilitate separation of the first and second lighting devices of a segmented light strip.

2. The lighting system of claim 1 wherein the first and second pluralities of lighting elements are configured to provide the light to the transmission interface of the light guide in a pattern exclusive of dark spots within the light guide.

3. The lighting system of claim 1 further comprising:
   a first encapsulant to encapsulate the first plurality of lighting elements between the first pair of reflector walls; and
   a second encapsulant to encapsulate the second plurality of lighting elements between the second pair of reflector walls.

4. The lighting system of claim 3 wherein the separator plate is between the first and second encapsulants of the first and second lighting devices to isolate the first encapsulant of the first lighting device from the second encapsulant of the second lighting device.

5. The lighting system of claim 1 wherein the first and second pluralities of lighting elements comprise a plurality of light emitting diode (LED) chips coupled to a corresponding plurality of conductive mounting plates on the first and second substrates, each of the plurality of LED chips having a bonding wire coupled to a corresponding plurality of conductive bonding plates.

6. The lighting system of claim 1 further comprising a third lighting device having a third plurality of lighting elements coupled to a third substrate between a third pair of reflector walls, wherein the third substrate and the third pair of reflector walls define a third exposed side of the third lighting device configured to match a fourth exposed side of the second lighting device opposite the second exposed side of the second lighting device.

7. A lighting device comprising:
   a substrate;
   a lighting element coupled to the substrate to emit light;
   a first reflector wall coupled substantially perpendicular to the substrate adjacent to the lighting element; and
   a second reflector wall coupled substantially perpendicular to the substrate adjacent to the lighting element and opposite the first reflector wall, wherein the first and second reflector walls define an element channel in which the lighting element is coupled to the substrate, and further define a first channel opening between adjacent ends of the first and second reflector walls at a first end of the substrate, wherein the lighting element is located a distance from the first channel opening, wherein the distance is approximately equal to one-half of a distance between the lighting element and another lighting element.

8. The lighting device of claim 7 wherein the first and second reflector walls farther define a second channel opening adjacent to the substrate between other adjacent ends of the first and second reflector walls at a second end of the substrate.

9. The lighting device of claim 8 further comprising an encapsulant to encapsulate the lighting element between the first and second reflector walls, wherein the encapsulant occupies the first channel opening at the adjacent ends and the second channel opening at the other adjacent ends of the first and second reflector walls.

10. The lighting device of claim 8 further comprising a first separator plate at the first channel opening and a second separator plate at the second channel opening.

11. The lighting device of claim 7 wherein the first reflector wall is freestanding in relation to the second reflector wall, and the first and second reflector walls are coupled via the substrate.

12. The lighting device of claim 7 wherein the lighting element comprises a light emitting diode (LED) and the substrate comprises a metal-coated plastic substrate.

13. A light strip comprising:
   a substrate;
   a plurality of lighting elements coupled to the substrate;
   a pair of reflector walls coupled to the substrate, wherein the reflector walls are on opposite sides of the plurality of lighting element; and
   a plurality of notches in the substrate to define a segmented light strip, wherein at least one notch is aligned with at least one separator plate, wherein the segmented light strip comprises a plurality of lighting devices, each lighting device having at least one lighting element.

14. The light strip of claim 13 further comprising an encapsulant to encapsulate the plurality of lighting elements, wherein the separator plate separates the encapsulant at a junction between the adjacent lighting devices.

15. The light strip of claim 13 wherein the plurality of lighting elements are equally spaced along the segmented light strip and the plurality of notches are located between the lighting elements on an opposite side of the substrate.

16. The light strip of claim 13 wherein the segmented light strip comprises at least three lighting devices.

17. The light strip of claim 13 wherein at least two of the plurality of lighting devices have different lengths and an unequal number of lighting elements.

* * * * *